United States Patent
Jegou

(10) Patent No.: US 11,002,877 B2
(45) Date of Patent: May 11, 2021

(54) SCANNING APPARATUS AND METHOD FOR THE DETECTION OF OBJECTS CONCEALED IN CARGO

(71) Applicant: SMITHS DETECTION FRANCE S.A.S., Vitry sur Seine (FR)

(72) Inventor: Guillaume Jegou, Vitry sur Seine (FR)

(73) Assignee: SMITHS DETECTION FRANCE S.A.S., Vitry-sur-Seine (FR)

( * ) Notice: Subject to any disclaimer, the term of this patent is extended or adjusted under 35 U.S.C. 154(b) by 0 days.

(21) Appl. No.: 16/472,495

(22) PCT Filed: Dec. 18, 2017

(86) PCT No.: PCT/GB2017/053779
§ 371 (c)(1),
(2) Date: Jun. 21, 2019

(87) PCT Pub. No.: WO2018/115824
PCT Pub. Date: Jun. 28, 2018

(65) Prior Publication Data
US 2020/0096666 A1 Mar. 26, 2020

(30) Foreign Application Priority Data

Dec. 22, 2016 (GB) .................................... 1622041

(51) Int. Cl.
*G01N 23/04* (2018.01)
*G01V 5/00* (2006.01)
*G01T 1/202* (2006.01)

(52) U.S. Cl.
CPC .......... *G01V 5/0016* (2013.01); *G01T 1/2023* (2013.01)

(58) Field of Classification Search
CPC ........... G01T 1/2018; G01T 1/20; G01T 3/06; G01T 7/00; G01T 1/2006; G01T 1/2008;
(Continued)

(56) References Cited

U.S. PATENT DOCUMENTS 5,943,388 A * 8/1999 Tumer ................. G01V 5/0041
378/98.11
6,931,098 B2 * 8/2005 Kump .................... A61B 6/405
348/E5.081
(Continued)

FOREIGN PATENT DOCUMENTS

| WO | 0173415 A2 | 10/2001 |
| WO | 2005103759 A1 | 11/2005 |
| WO | 2013116549 A1 | 8/2013 |

OTHER PUBLICATIONS

Notification of Transmittal of the International Search Report and the Written Opinion of the International Searching Authority, dated Apr. 24, 2018, PCT/GB2017/053779.
(Continued)

*Primary Examiner* — Irakli Kiknadze
(74) *Attorney, Agent, or Firm* — Kevin E. West; Advent, LLP

(57) ABSTRACT

In one embodiment, there is provided a detection device (1) for a system for inspection of cargo, comprising: at least one scintillator (4) configured to re-emit light in response to: interaction with successive first radiation pulses (5) emitted by a generator (6), and/or interaction with second radiation (5) generated by a radioactive source (8) located in the cargo (3) to inspect; at least one first acquisition line (9) configured to measure a quantity associated with the light re-emitted by the at least one scintillator in response to interaction with the successive first radiation pulses; and at least one a second acquisition line (10) configured to measure a quantity associated with the light re-emitted by the at least one scintillator in response to interaction with at least the second radiation.

18 Claims, 6 Drawing Sheets

(58) Field of Classification Search
CPC .......... G01T 5/08; G01T 1/023; G01T 1/169;
G01T 1/2023; G01T 1/29; G01T 1/2985;
G01T 1/208; G01T 1/203; G01T 1/167;
G01T 1/16; G01T 1/17; G01T 1/2935;
G01T 1/026; G01T 1/1614; G01T 1/24;
G01T 1/2928; G01V 5/0016; G01V
5/0075; G01V 5/0041; G01V 5/0025;
G01V 5/0033; G01V 5/0066; G01V
5/0091; G01V 5/0008; G01V 5/0069;
G01V 5/005; G02B 6/02395; G01N
23/203; G01N 23/005; G01N 23/04;
G01N 23/02; G01N 2223/076; G01N
23/223; G01N 2223/419; G01N 23/043;
G01N 23/046; G01N 23/083; A61B
6/505; A61B 6/508; A61B 6/032; A61B
6/06; A61B 6/4241; A61B 6/488; A61B
6/5205; A61B 6/542; A61B 6/00; A61B
6/027; A61B 6/0487; A61B 6/4028; A61B
6/4035; A61B 6/4042; A61B 6/4056;
A61B 6/4085; A61B 6/4225; A61B
6/4233; A61B 6/4266; A61B 6/4275;
G21K 1/043; G21K 1/10; G21K 1/00;
G21K 1/04; H01L 27/146; H05G 1/60;
H05G 1/08; H05G 1/26; Y10S 378/901;
H03M 1/123; H03M 1/58; G06T 1/60;
G06T 5/50; H04N 5/32; H04N 5/374
USPC ...................................................... 378/57, 62
See application file for complete search history.

(56) References Cited

U.S. PATENT DOCUMENTS

| | | | | |
|---|---|---|---|---|
| 8,971,484 | B2* | 3/2015 | Beckmann | G01N 23/046 |
| | | | | 378/51 |
| 9,352,851 | B2* | 5/2016 | Tudor | G01V 5/0008 |
| 9,635,748 | B2* | 4/2017 | Fox | H05G 1/60 |
| 10,247,682 | B2* | 4/2019 | Schlecht | G01N 23/046 |
| 2003/0165211 | A1 | 9/2003 | Grodzins et al. | |
| 2009/0257555 | A1 | 10/2009 | Chalmers et al. | |
| 2014/0226789 | A1 | 8/2014 | Bendahan et al. | |

OTHER PUBLICATIONS

United Kingdom Search Report dated Mar. 1, 2017, App. No. GB1622041.0.

* cited by examiner

SCANNING APPARATUS AND METHOD FOR THE DETECTION OF OBJECTS CONCEALED IN CARGO

FIELD OF INVENTION

The present disclosure relates to scanning apparatus and methods and to the detection of objects concealed in cargo, for example by imaging.

BACKGROUND

Inspection systems use inspection radiation for inspecting cargo (such as a vehicle), for example to detect hidden objects (such as weapons or dangerous material). Dangerous material may include radioactive source (such as gamma radiation or neutron radiation), e.g. located in the cargo to inspect.

It is known to provide dedicated detectors to detect the radioactive source, additionally to detectors detecting the inspection radiation. However, the known additional detectors are often expensive and cumbersome.

Aspects of the present invention address some of the above issues.

SUMMARY OF INVENTION

Aspects and embodiments of the present disclosure, such as those set out in the appended claims, aim to address the above mentioned technical problem, and related technical problems.

PRESENTATION OF THE FIGURES

Embodiments of the disclosure will now be described, by way of example only, with reference to the accompanying drawings, in which.

In the drawings, like elements are referred to by the same numerical references.

DESCRIPTION OF EXAMPLE EMBODIMENTS

Overview

Figure 1:
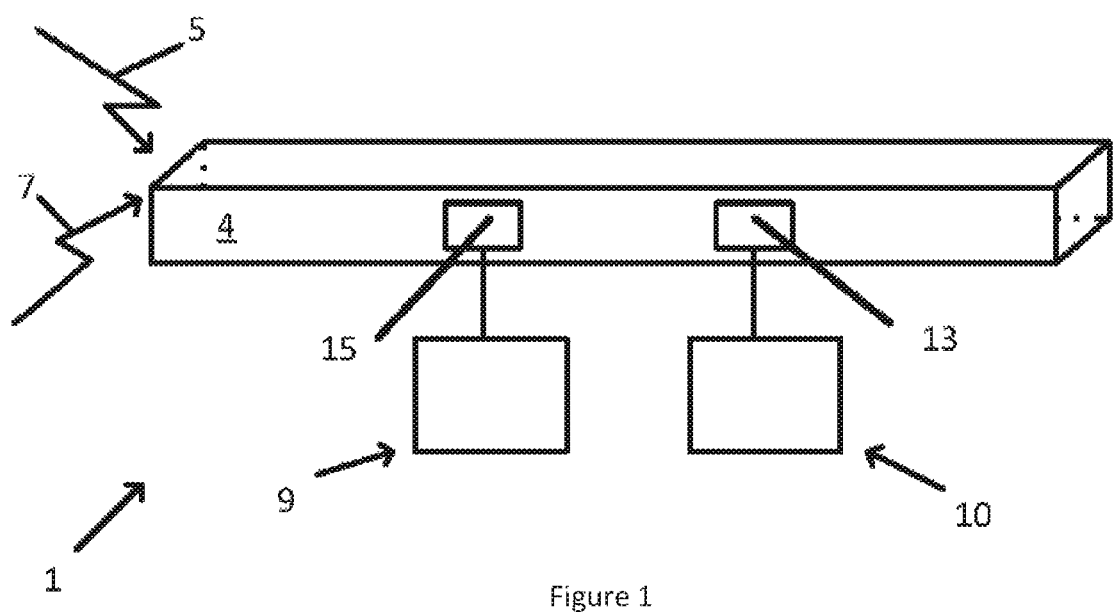
FIG. 1 shows an example detection device, viewed from a lateral side.
Figure 2:
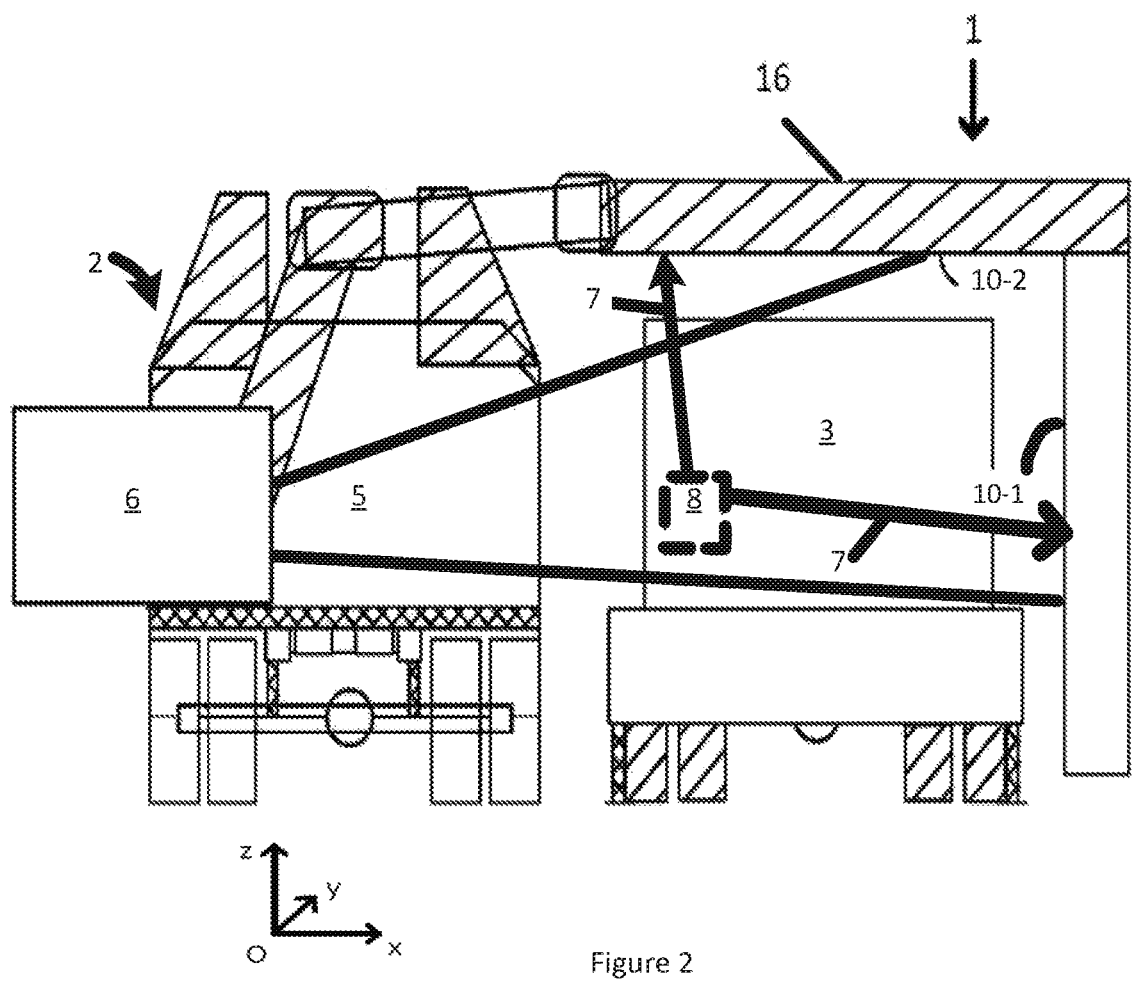
FIG. 2 shows an example system for inspection, viewed a rear side.

FIG. 1 shows a schematic illustration of a detection device 1. As illustrated by FIG. 2, the detection device 1 is suitable for being used with a system 2 for inspection of cargo 3. The detection device 1 comprises at least one scintillator 4.

The scintillator 4 is configured to re-emit light in response to interaction with successive first radiation pulses 5, e.g. emitted by a generator. In the example of FIG. 2, the system 2 may comprise a generator 6 configured to emit the successive first radiation pulses 5, such as X-ray radiation as a non-limiting example.

The scintillator 4 is also configured to re-emit light in response to interaction with a second radiation 7 generated by a radioactive source (such as gamma radiation as a non-limiting example), e.g. by the radioactive source 8 located in the cargo 3 to inspect as illustrated in FIG. 2.

The detection device 1 of FIG. 1 comprises a first acquisition line 9 configured to measure (e.g. acquire and/or sense and/or capture) a quantity associated with the light re-emitted by the at least one scintillator 4 in response to interaction with the successive first radiation pulses 5. In some examples, the quantity associated with the light may be the light itself.

The detection device 1 of FIG. 1 comprises at least one second acquisition line 10 configured to measure (e.g. acquire and/or sense and/or capture) a quantity associated with the light re-emitted by the at least one scintillator 4 in response to interaction with at least the second radiation 7. In some examples, the quantity associated with the light may be the light itself.

As described in more detail below, the device 1 may comprise more than one second acquisition line 10.

It should be understood that the device 1 may also comprise more than one first acquisition line 9.

In some examples, the detection device 1 may comprise at least a processor and a memory.

The device according to the disclosure enables using the same scintillator for both the first acquisition line and the second acquisition line. The device according to the disclosure may enable not using additional, remote and cumbersome detectors for detection of dangerous material.

In some examples and as disclosed in greater detail below, the device according to the disclosure enables using low sensitivity and low cost sensors in the detection device, while not being detrimental to the quality of the detection.

In some examples, if the generator cannot emit the first radiation pulses (e.g. because of a radiation safety reason or because a boom (disclosed in greater detail below) is in road configuration (e.g. closed)), the quantity associated with the light re-emitted by the at least one scintillator in response to interaction with at least the second radiation can still be measured.

In some examples, the at least one second acquisition line is cheaper and lighter because there is no additional scintillator. Furthermore, because there is no additional scintillator, the at least one second acquisition line does not appear to radioactive material smugglers, and thus the radioactive material smugglers are less likely to shield the radioactive source.

Detailed Description of Example Embodiments

In the example illustrated by FIG. 2, the inspection system 2 may be mobile and may be transported from a location to another location. In some examples the system 2 may comprise an automotive vehicle.

Figure 3:
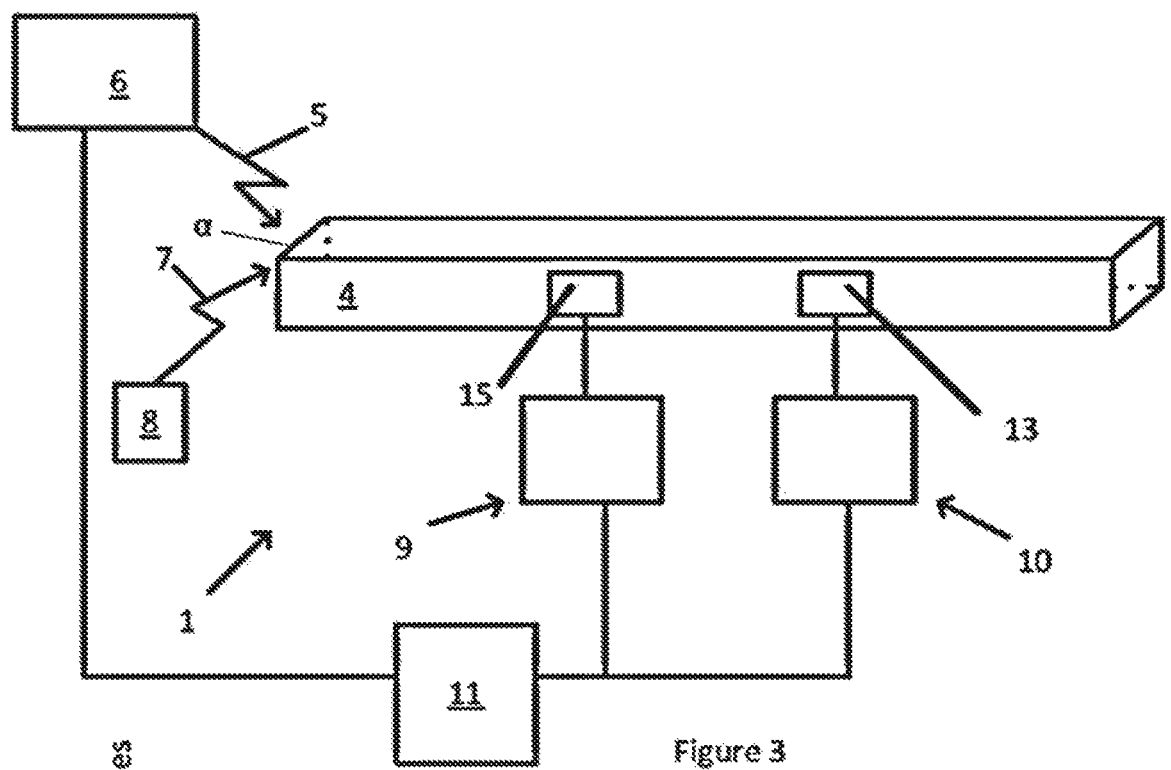
FIG. 3 shows another example detection device, viewed from a lateral side.

In the example illustrated in FIG. 3, the detection device 1 further comprises a controller 11 configured to operate in synchrony with the generator 6.

The controller 11 is configured to cause the second acquisition line 10 to measure the quantity associated with the light re-emitted in response to the interaction with at least the second radiation 7 during periods of time other than when the generator 6 emits the successive first radiation pulses 5.

In some examples, the controller 11 may be configured to activate the second acquisition line 10 during the periods of time other than when the generator 6 emits the successive first radiation pulses 5.

Figure 4:
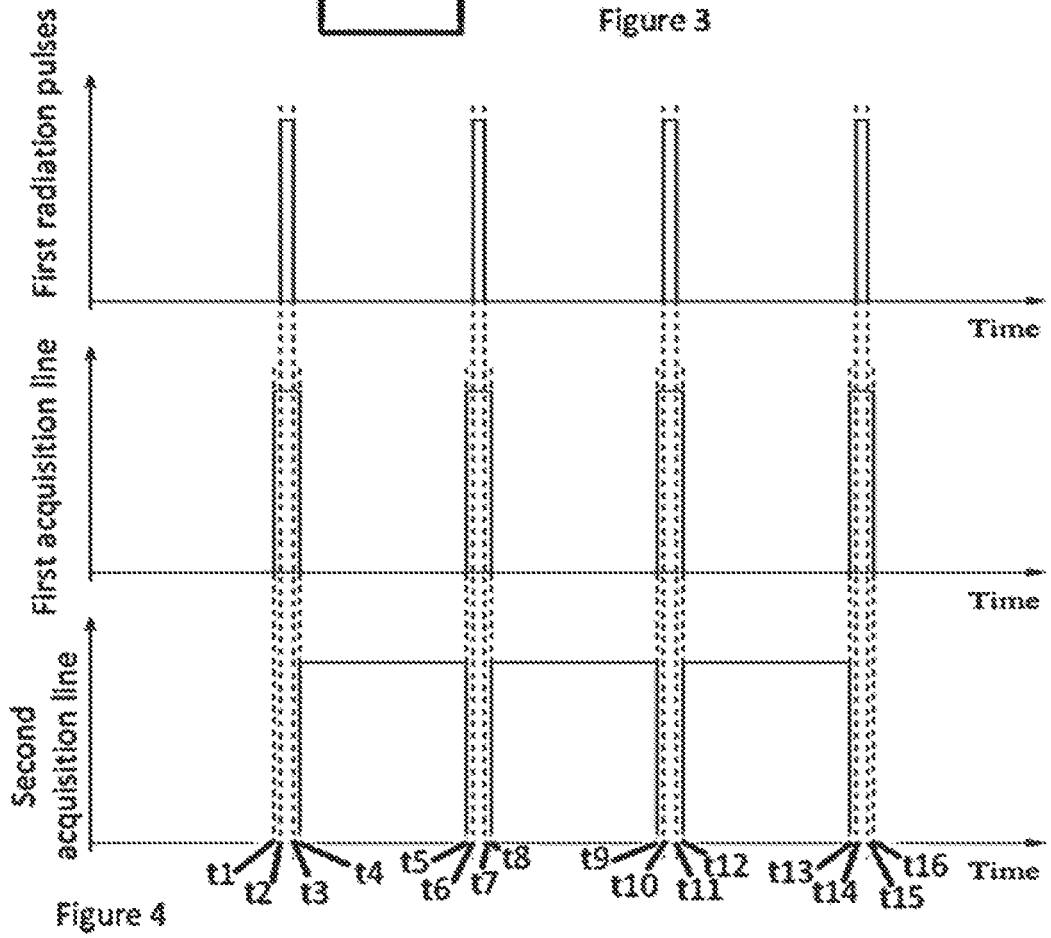
FIG. 4 shows, in an upper section generation of first radiation pulses as a function of time, in a middle section an example operation of a first acquisition line as a function of time, and in a lower section an example operation of a second acquisition line as a function of time.

In the example illustrated in FIG. 4, the generator 6 emits the successive first radiation pulses 5, e.g. between t2 and t3, between t6 and t7, between t10 and t11, and between t14 and t15. In the example of FIG. 4, the controller 11 activates the second acquisition line 10 during the periods such as e.g. between t4 and t5, t8 and t9, and t12 and t13.

It should be understood that re-emission by the scintillator 4 in response to interaction with the successive first radiation pulses 5 does not stop instantaneously as the interaction stops. The re-emission follows an exponential behaviour comprising two components. A first component is a short component called "scintillation decay time" (with e.g. a decay constant equal to a few microseconds, such as e.g. comprised between 0.1 μs and 20 μs as non-limiting examples). A second component is a longer component: after the interaction stops, the re-emission may last a period of time (e.g. a time period) of a several seconds, depending on the material of the scintillator 4. This phenomenon is called "after glow".

In some examples (e.g. with a thick cargo 3), the light re-emitted by the scintillator 4 in response to interaction with the successive first radiation pulses 5 may be usually relatively small compared to the afterglow. For some scintillators, afterglow levels can be up to 0.001 of the first radiation pulses 5. Then, after being transmitted through a thick cargo 3, the X-ray signal can be 0.0005 and thus the afterglow signal is twice an X-ray signal.

It should also be understood that the light re-emitted by the scintillator 4 in response to interaction with the second radiation 7 is usually relatively small compared to the light re-emitted in response to interaction with the successive first radiation pulses 5.

The periods between:
the end of the generation of the successive first radiation pulses 5, and
the beginning of the operation of the second acquisition line 10,
i.e. the periods between t3 and t4, t7 and t8, t11 and t12, and t15 and t16, enable the light re-emitted due to the afterglow effect to decrease to be negligible with respect to the light re-emitted in response to interaction with the second radiation 7.

Alternatively or additionally, the scintillator 4 may have a relatively low afterglow time period, such as
smaller than 5%, 5 ms after the interaction with the e.g. first radiation pulses 5 stops, or
smaller than 0.1%, 5 ms after the interaction with the e.g. first radiation pulses 5 stops, or
smaller than 0.005%, 5 ms after the interaction with the e.g. first radiation pulses 5 stops.

In some examples, the at least one scintillator 4 comprises an organic scintillator, such as models BC400 and/or BC430 available from the brand Saint Gobain, or models EJ200 and/or EJ260 available from the brand Eljen. Organic scintillators are low cost. Organic scintillators are low density and may thus be manufactured as relatively large scintillators, which may provide a relatively large solid angle associated with an area a for capture of the second radiation 7 by the scintillator 4 (see e.g. FIG. 3). Organic scintillators may thus provide a relatively high sensitivity to the relatively low energy of the second radiation 7.

Alternatively or additionally, the at least one scintillator 4 comprises an inorganic scintillator, such as comprising Cesium Iodide, CsI (decay constant equal to 1 μs), and/or Cadmium Tungstate, $CdWO_4$ (decay constant equal to 14 μs), and/or Bismuth Germanate, BGO (decay constant equal to 0.3 μs), as non-limiting examples.

In some examples, the at least one scintillator 4 may comprise at least a dopant material, to be configured to interact e.g. with neutron radiation.

In the example illustrated in FIG. 4, the controller 11 is further configured to cause the second acquisition line 10 not to measure the quantity associated with the light re-emitted in response to the interaction with at least the second radiation 7 during the periods of time when the generator 6 emits the successive first radiation pulses 5, i.e. at least during the periods between t2 and t3, t6 and t7, t10 and t11 and t14 and t15.

In the example illustrated in FIGS. 3 and 4, the controller 11 may be configured to activate the first acquisition line 9 during the periods of time when the generator 6 emits the successive first radiation pulses 5, i.e. at least between t2 and t3, t6 and t7, t10 and t11 and t14 and t15. In the example illustrated in FIG. 4, the controller 11 may be configured to activate the first acquisition line 9 between t1 and t4, t5 and t8, t9 and t12 and t13 and t16, to ensure measurement of any light emitted due to interaction with the successive first radiation pulses 5.

Figure 5:
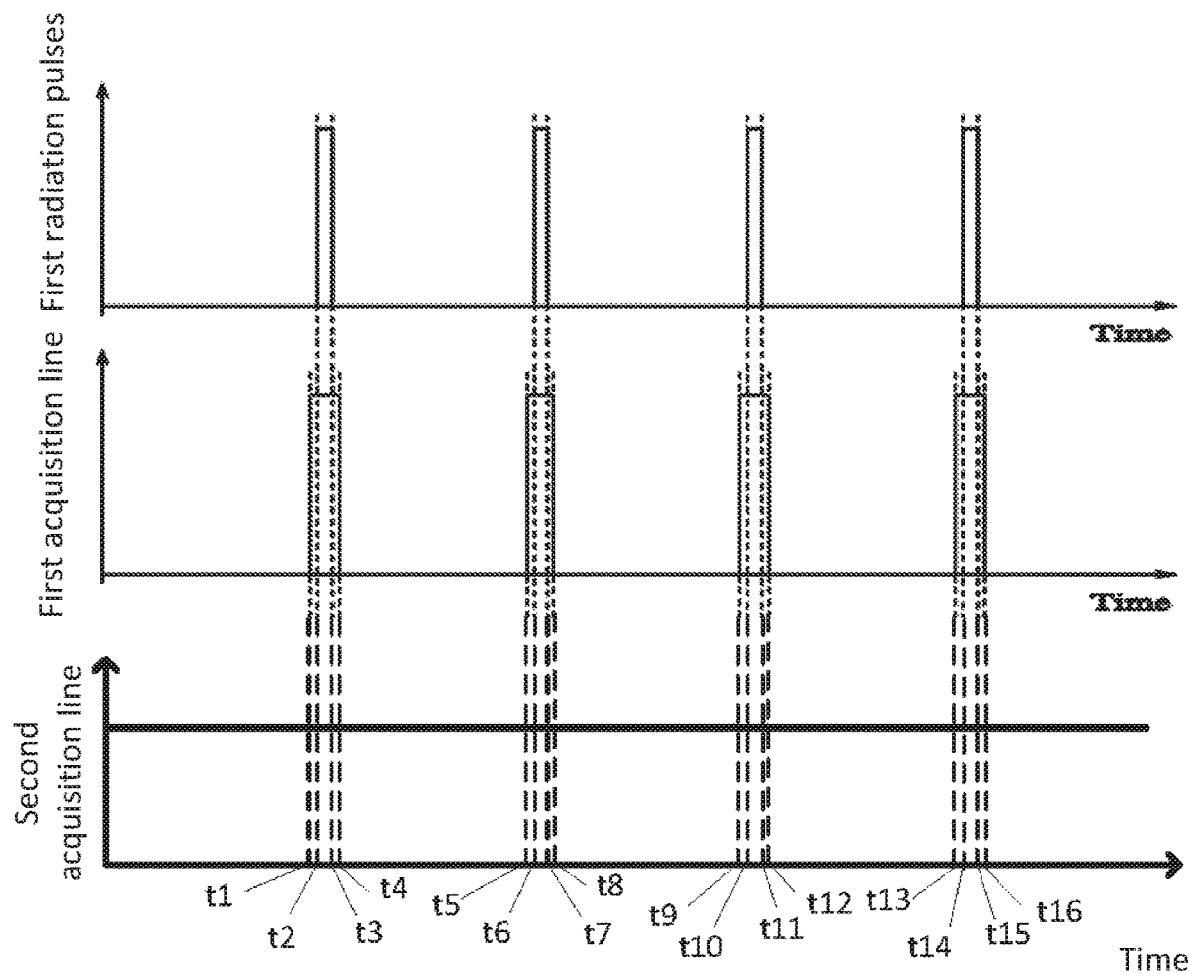
FIG. 5 shows, in an upper section generation of first radiation pulses as a function of time, in a middle section an example operation of a first acquisition line as a function of time, and in a lower section an example operation of a second acquisition line as a function of time.

In the example illustrated in FIG. 5, the second acquisition line 10 may be configured to measure a quantity continuously, i.e. measure a quantity associated with the light re-emitted in response to interaction with both the second radiation 7 and the first radiation pulses 5, e.g. even during the periods of time when the generator 6 emits the successive first radiation pulses 5, i.e. even between t2 and t3, t6 and t7, t10 and t11 and t14 and t15. In the example illustrated in FIG. 5, the controller 11 may be configured to activate the first acquisition line 9 between t1 and t4, t5 and t8, t9 and t12 and t13 and t16, to ensure measurement of any light emitted due to interaction with the successive first radiation pulses 5.

Figure 6:
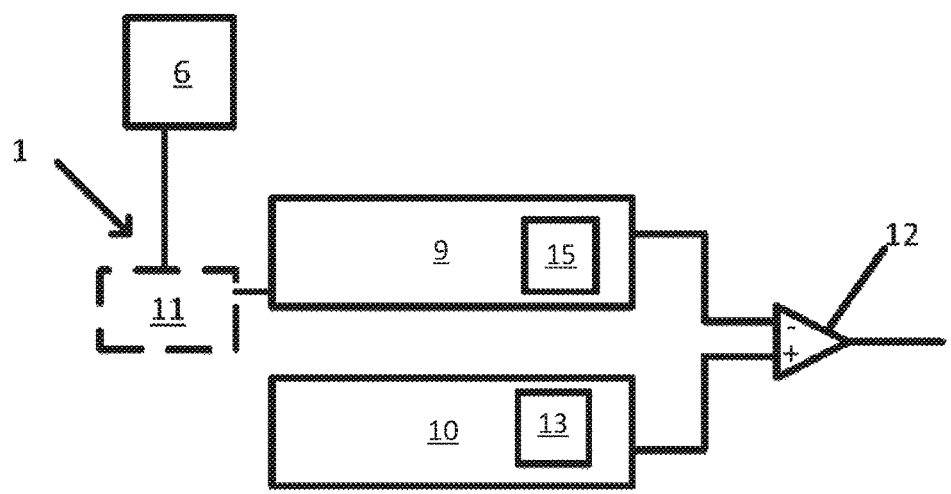
FIG. 6 shows another example detection device, viewed from a lateral side.

In the example illustrated in FIG. 6, the device 1 comprises a subtracter 12 configured to determine a quantity associated with a difference between:
the quantity measured by the at least one second acquisition line 10 (i.e. as in FIG. 5); and
a measure associated the first acquisition line 9 (i.e. as in FIG. 5).

It should be understood that the quantity associated with the difference may be representative of the light re-emitted in response to interaction with the second radiation 7, i.e once the contribution of the light re-emitted in response to interaction with the first radiation pulses 5 is subtracted.

It should be understood that in some examples the device 1 may not comprise a controller 11 synchronized with the generator 6.

In the examples of FIGS. 1, 3, 6, 7 and 8, the second acquisition line 10 comprises at least one sensor 13 configured to detect the light re-emitted by the at least one scintillator 4 in response to interaction with at least the second radiation 7.

In some examples, the at least one sensor 13 may be connected to the at least one scintillator 4, as illustrated e.g. in FIGS. 1 and 3. The at least one sensor 13 may comprise at least one of:
- a Silicon PhotoMultiplier, SiPM; and/or
- a photomultiplier tube, PMT; and/or
- an avalanche photodiode; and/or
- a photodiode.

Figure 7:
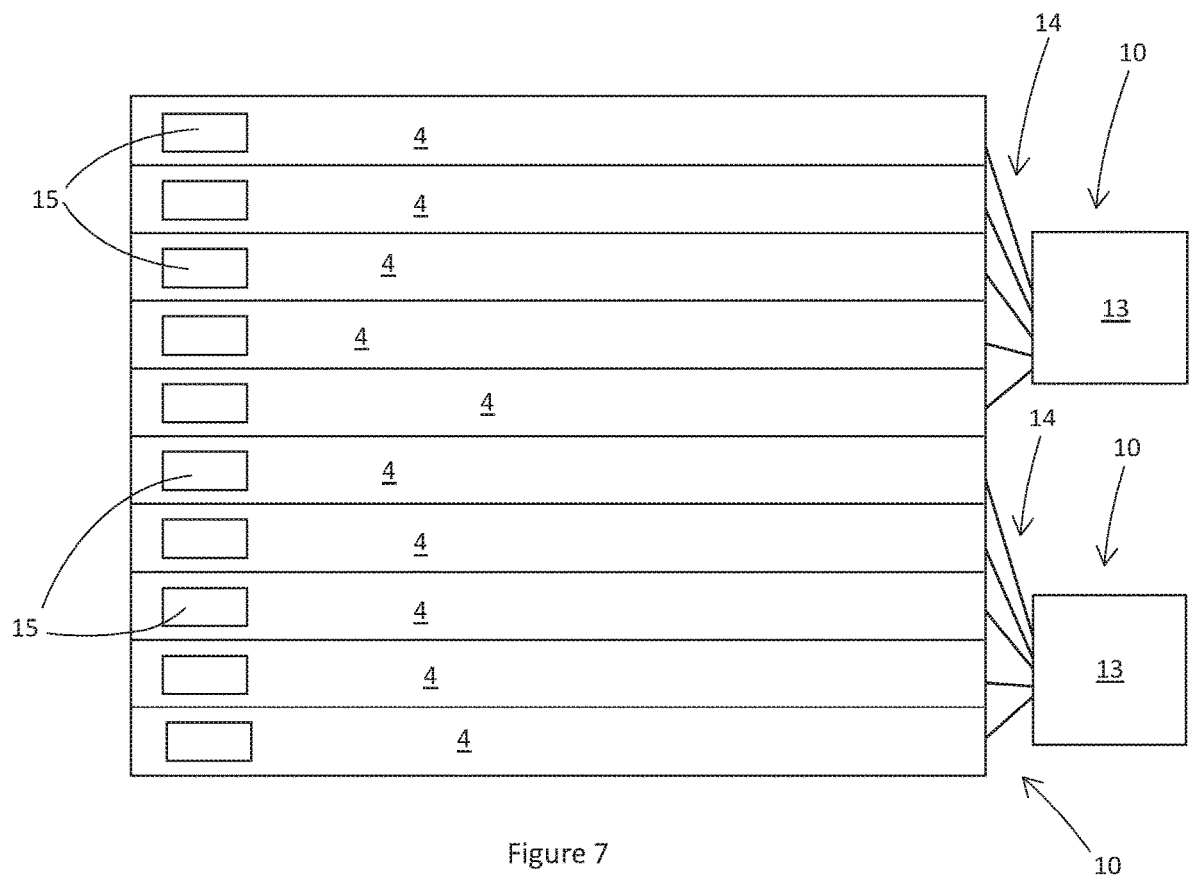
FIG. 7 shows another example detection device, viewed from a lateral side.

In the example illustrated in FIG. 7, the detection device 1 comprises a plurality of scintillators 4, for example ten scintillators 4, as a non-limiting example. It should be understood that in some examples, the device 1 for the system 2 for inspection of cargo 3 as illustrated in FIG. 2 may comprise up to about 1200 scintillators 4, or more.

In the example illustrated in FIG. 7, the device 1 comprises two second acquisition lines 10. In some examples, the device 1 according to the disclosure enables better reliability, as a second acquisition line 10 may be malfunctioning, but the device 1 would still measure a quantity associated with the second radiation 7 thanks to e.g. the other second acquisition line 10.

In the example illustrated in FIG. 7, each of the second acquisition lines 10 comprises an optical coupling 14 configured to connect the at least one sensor 13 to at least a subset of the plurality of scintillators 4. In the example illustrated in FIG. 7, the optical coupling 14 is configured to connect each of the sensors 13 to a subset of e.g. five of the plurality of ten scintillators 4. Other values for the number of scintillators 4 in the subset are envisaged, such as 32 or 100 scintillators 4, depending on the number of scintillators 4 in the plurality. In some examples, the device 1 according to the disclosure enables using low sensitivity (and thus low cost) sensors in the detection device, while not being detrimental to the quality of the detection, as the contributions of all of the scintillators 4 in the at least subset are added together in the optical coupling 14 and brought to a corresponding sensor 13 for detection. It should be understood, however, that the corresponding sensor 13 is associated with one pixel corresponding to the sum of the at least a subset of the plurality of scintillators 4.

In some examples, the optical coupling 14 may comprise one or more light guides and/or one or more optical fibers configured to connect each scintillator 4 of the at least a subset of the plurality of scintillators 4 to the at least one sensor 13. In some examples, the device 1 according to the disclosure enables better reliability, as one scintillator 4 and/or one part of the optical coupling 14 could be malfunctioning, but the device 1 would still measure a quantity associated with the second radiation 7 thanks to the other scintillators 4 and/or other parts of the optical coupling 14.

In the example illustrated in FIG. 2, the device 1 comprises more than one second acquisition line 10, e.g. two second acquisition lines 10 (other numbers of second acquisition lines are envisaged). The two second acquisition lines 10 may for example be located on an electro-hydraulic boom 16 of the system 2 for inspection of the cargo 3. The device 1 may thus further be configured to locate the radioactive source 8 in at least one direction transverse to a direction (Oy) of motion of the cargo 3 with respect to the detection device 1, using the quantities measured by the plurality of second acquisition lines 10. In the example illustrated in FIG. 2, the device 1 comprises the plurality of second acquisition lines 10-1 and 10-2, and the device 1 is configured to locate the radioactive source 8 in the directions (Oz) and (Ox), transverse to the direction (Oy) of motion of the cargo 3 with respect to the detection device 1, using the quantities measured by the plurality of second acquisition lines 10-1 and 10-2 (such as the intensity of the signal measured by each of the second acquisition lines 10-1 and 10-2, respectively).

In the example illustrated in FIG. 2, the device 1 is located on an L-shaped electro-hydraulic boom 16. It should be understood that depending on the structure on which the plurality of second acquisition lines 10 are positioned, the device 1 according to the disclosure may measure a quantity associated with the second radiation 7 on a wide spatial angle.

Alternatively or additionally, and as illustrated in FIG. 2, the detection device 1 may further be configured to locate the radioactive source 8 in the direction (Oy) of motion of the cargo 3 with respect to the detection device 1, using at least a quantity measured by the at least one second acquisition line 10 (such as the intensity of the signal measured by each of the second acquisition lines 10-1 and 10-2). It should however be understood that the detection device 1 need not having a plurality of second acquisition lines 10 to be configured to locate the radioactive source 8 in the direction (Oy), as this location is time dependent as a function of the motion of the cargo 3 with respect to the detection device 1.

Figure 8:
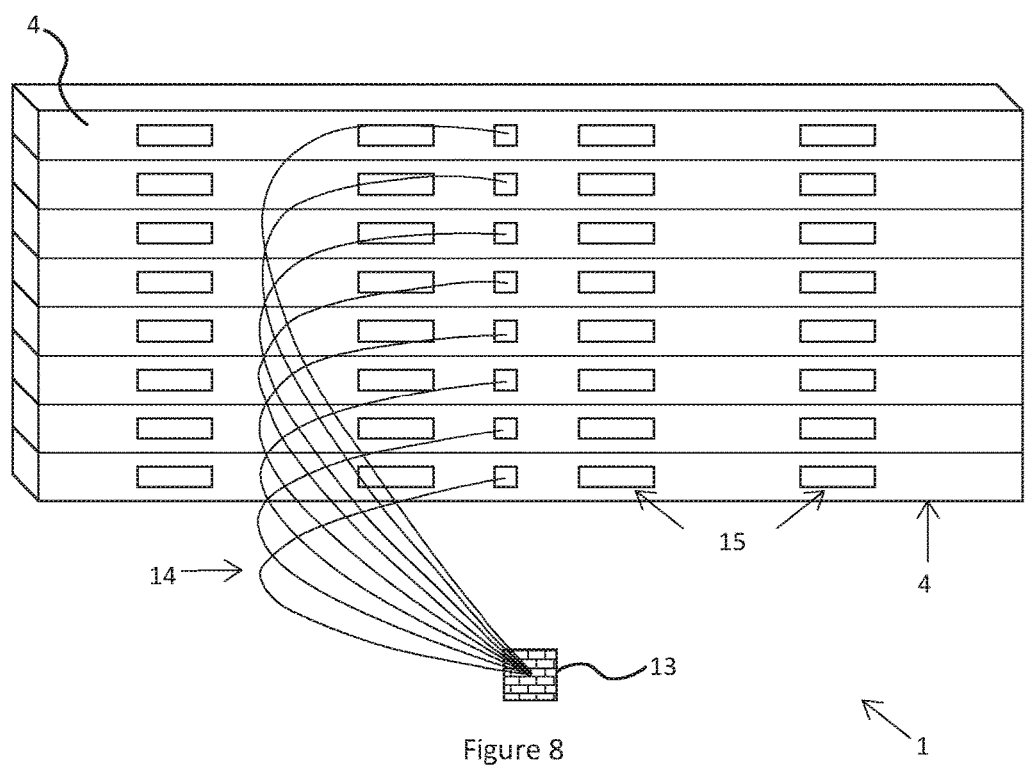
FIG. 8 shows another example detection device, viewed from a lateral side.

In the example illustrated in FIG. 8, the detection device 1 comprises a plurality of scintillators 4, for example eight scintillators 4. In the example illustrated in FIG. 8, the device 1 comprises one second acquisition line 10. The second acquisition line 10 comprises an optical coupling 14 configured to connect the sensor 13 to all of the plurality of scintillators 4. In the example illustrated in FIG. 8, the sensor 13 comprises a photodiode and the optical coupling 14 comprises optical fibers.

As illustrated e.g. in FIGS. 1, 3, 6, 7 and 8 the first acquisition line 9 may comprise at least one radiation sensor 15 configured to detect the light re-emitted by the at least one scintillator 4 in response to interaction with the successive first radiation pulses 5. As illustrated in the FIGS. 1, 3, 7 and 8, the at least one radiation sensor 15 may be connected to the at least one scintillator 4. In the example of FIGS. 1 and 7, the device 1 comprises one radiation sensor 15 for each scintillator 4. In the example of FIG. 8, the device 1 comprises four radiation sensors 15 for each scintillator 4. Other numbers of radiation sensors for each scintillator 4 are envisaged.

The at least one radiation sensor 15 may comprise:
- a Silicon PhotoMultiplier, SiPM; and/or
- an avalanche photodiode; and/or
- a photodiode.

The successive first radiation pulses 5 may comprise at least one of X-ray radiation and/or gamma radiation and/or neutron radiation. The second radiation may comprise at least one of gamma radiation and/or neutron radiation.

Figure 9:
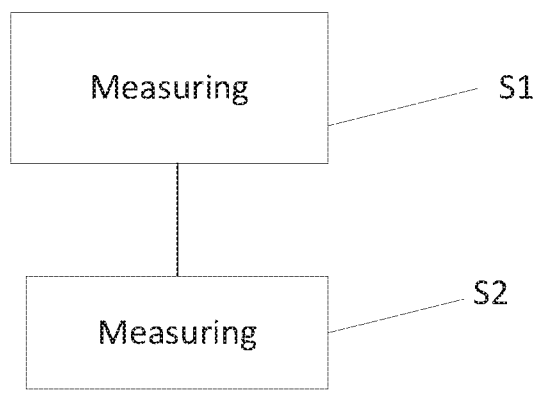
FIG. 9 shows a flowchart that illustrates an example method according to the disclosure.

As illustrated in FIG. 9, a method according to the disclosure may comprise:
- measuring, at S1, a quantity associated with light re-emitted by at least one scintillator in response to interaction with successive first radiation pulses emitted by a generator; and
- measuring, at S2, a quantity associated with light re-emitted by the at least one scintillator in response to interaction with at least second radiation generated by a radioactive source located in cargo to inspect.

In some examples, the method described above may be performed, at least partly, on a detection device as described above.

Variations and Modifications

Other variations and modifications will be apparent to the skilled in the art in the context of the present disclosure, and various features described above may have advantages with or without other features described above.

The energy of the X-rays may be comprised between 1 MeV and 15 MeV, and the dose may be comprised between 2 mGy and 20 Gy (Gray) per minute at 1 meter. In the example illustrated by FIG. 2, the power of the X-ray generator may be e.g., between 500 keV and 9.0 MeV, typically e.g., 2 MeV, 3.5 MeV, 4 MeV, or 6 MeV, for a steel penetration capacity e.g., between 150 mm to 350 mm, typically e.g., 200 mm (7.9 in). In the example illustrated by FIG. 2, the dose may be e.g., up to 600 mGy/min at 1 m.

The system may also be static with respect to the ground. In such examples, the power of the X-ray generator may be e.g., between 4 MeV and 10 MeV, typically e.g., 9 MeV, for a steel penetration capacity e.g., between 300 mm to 450 mm, typically e.g., 410 mm (16.1 in). The dose may be 17 Gy/min at 1 m.

As one possibility, there is provided a computer program, computer program product, or computer readable medium, comprising computer program instructions to cause a programmable computer to carry out any one or more of the methods described herein. In example implementations, at least some portions of the activities related to the device herein may be implemented in software. It is appreciated that software components of the present disclosure may, if desired, be implemented in ROM (read only memory) form. The software components may, generally, be implemented in hardware, if desired, using conventional techniques.

In some examples, components of the device 1 may use specialized applications and hardware.

In some examples, one or more memory elements can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A detection device for a system for inspection of cargo, comprising:
   at least one scintillator configured to re-emit light in response to:
      interaction with successive first radiation pulses emitted by a generator, and/or
      interaction with second radiation generated by a radioactive source located in the cargo to inspect;
   at least one first acquisition line configured to measure a quantity associated with the light re-emitted by the at least one scintillator in response to interaction with the successive first radiation pulses;
   at least one second acquisition line configured to measure a quantity associated with the light re-emitted by the at least one scintillator in response to interaction with at least the second radiation; and
   a controller configured to operate in synchrony with the generator and cause the at least one second acquisition line to measure the quantity associated with the light reemitted in response to interaction with at least the second radiation during periods of time other than when the generator emits the successive first radiation pulses, the controller further configured to locate the radioactive source in a direction of motion of the cargo with respect to the detection device, using at least a quantity measured by the at least one second acquisition line.

2. The detection device of claim 1, wherein the controller is configured to activate the at least one second acquisition line during the periods of time other than when the generator emits the successive first radiation pulses.

3. The detection device of claim 1, wherein the controller is further configured to cause the at least one second acquisition line not to measure the quantity associated with the light re-emitted in response to interaction with at least the second radiation during periods of time when the generator emits the successive first radiation pulses.

4. The detection device of claim 1, wherein the at least one second acquisition line is configured to measure a quantity associated with the light re-emitted in response to interaction with the second radiation and the first radiation during periods of time when the generator emits the successive first radiation pulses, and further comprising:
   a subtracter configured to determine a quantity associated with a difference between:
      the quantity measured by the at least one second acquisition line, and
      a measure associated the at least one first acquisition line.

5. The detection device of claim 1, wherein the at least one second acquisition line comprises at least one sensor configured to detect the light re-emitted by the at least one scintillator in response to interaction with at least the second radiation.

6. The detection device of claim 5, wherein the at least one sensor is connected to the at least one scintillator.

7. The detection device of claim 5, wherein the at least one sensor comprises at least one of: a Silicon PhotoMultiplier, SiPM; and/or a photomultiplier tube, PMT; and/or an avalanche photodiode; and/or a photodiode.

8. The detection device of claim 1, comprising a plurality of scintillators, wherein the at least one second acquisition line comprises an optical coupling configured to connect the at least one sensor to at least a subset of the plurality of scintillators.

9. The detection device of claim 8, wherein the optical coupling comprises one or more light guides and/or one or more optical fibers configured to connect each scintillator of the at least a subset of the plurality of scintillators to the at least one sensor.

10. The detection device of claim 1, comprising a plurality of second acquisition lines, and further configured to locate the radioactive source in at least one direction transverse to a direction of motion of the cargo with respect to the detection device, using the quantities measured by the plurality of second acquisition lines.

11. The detection device of claim 1, wherein the at least one first acquisition line comprises at least one radiation sensor configured to detect the light reemitted by the at least one scintillator in response to interaction with the successive first radiation pulses.

12. The detection device of claim 11, wherein the at least one radiation sensor is connected to the at least one scintillator.

13. The detection device of claim 11, wherein the at least one radiation sensor comprises at least one of: a Silicon PhotoMultiplier, SiPM; an avalanche photodiode; or a photodiode.

14. The detection device of claim 1, wherein the at least one scintillator comprises at least one of an organic scintillator or an inorganic scintillator.

15. The detection device of claim 14, wherein the at least one scintillator includes an inorganic scintillator, the inorganic scintillator comprising at least one of: Cesium Iodide, CsI; Cadmium Tungstate, $CdWO_4$; or Bismuth Germanate, BGO.

16. The detection device of claim 1, wherein the successive first radiation pulses comprise at least one of X-ray radiation, gamma radiation, or neutron radiation.

17. The detection device of claim 1, wherein the second radiation comprises at least one of gamma radiation and/or neutron radiation.

18. The detection device of claim 17, wherein the at least one scintillator comprises at least a dopant material.

* * * * *